Jan. 15, 1935.	H. E. MUSSELMAN	1,988,327
WHEEL ALIGNMENT TESTING DEVICE
Filed March 9, 1931	2 Sheets-Sheet 1
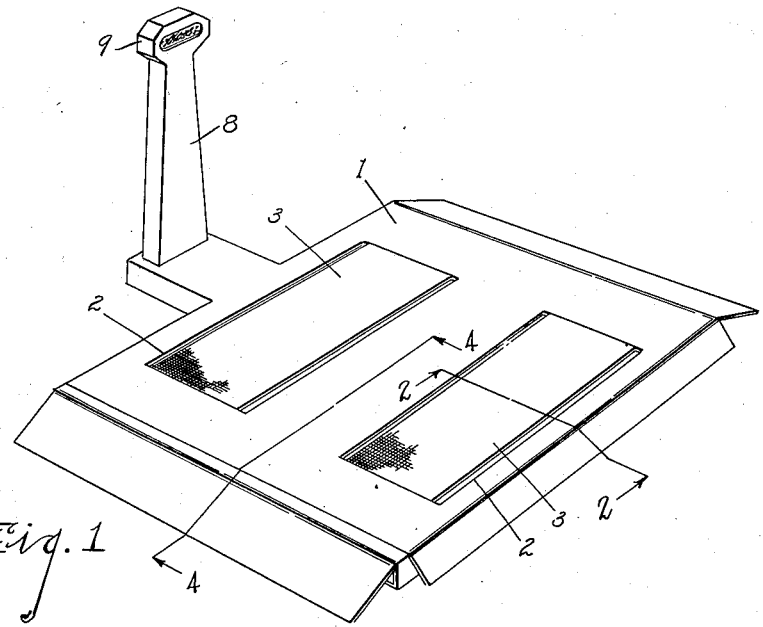
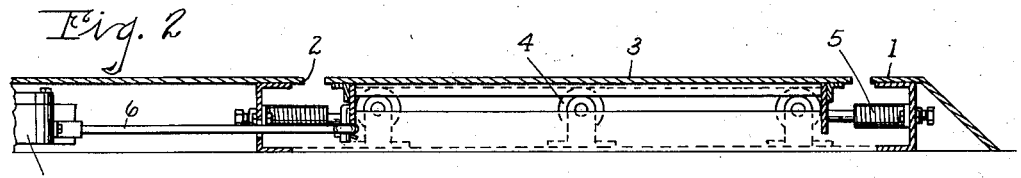
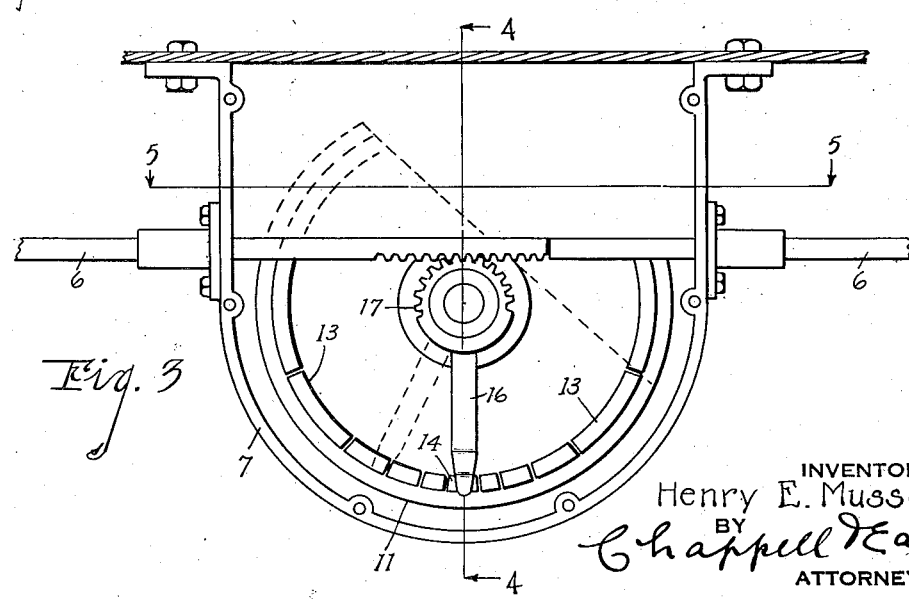
INVENTOR
Henry E. Musselman
BY
Chappell Earl
ATTORNEYS Jan. 15, 1935.  H. E. MUSSELMAN  1,988,327
WHEEL ALIGNMENT TESTING DEVICE
Filed March 9, 1931    2 Sheets-Sheet 2

INVENTOR
Henry E. Musselman
BY
Chappell & Earl
ATTORNEYS

Patented Jan. 15, 1935

1,988,327

UNITED STATES PATENT OFFICE 1,988,327

WHEEL ALIGNMENT TESTING DEVICE

Henry E. Musselman, Kalamazoo, Mich., assignor to Atlas Press Company, Kalamazoo, Mich.

Application March 9, 1931, Serial No. 521,204

5 Claims. (Cl. 177—311)

The main object of this invention is to provide a wheel alignment testing device for motor vehicles which permits rapid and easy determination of the alignment of the wheels of motor vehicles.

Objects relating to details and economies of my invention will appear from the description to follow. The invention is defined and pointed out in the claims.

A structure which is a preferred embodiment of my invention is illustrated in the accompanying drawings, in which:

Fig. 1 is a perspective view of my improved wheel alignment testing machine or apparatus.

Fig. 2 is a fragmentary view mainly in vertical transverse section on a line corresponding to line 2—2 of Fig. 1.

Fig. 3 is a fragmentary view partially in section on line 3—3 of Figs. 4 and 5.

Figure 4:
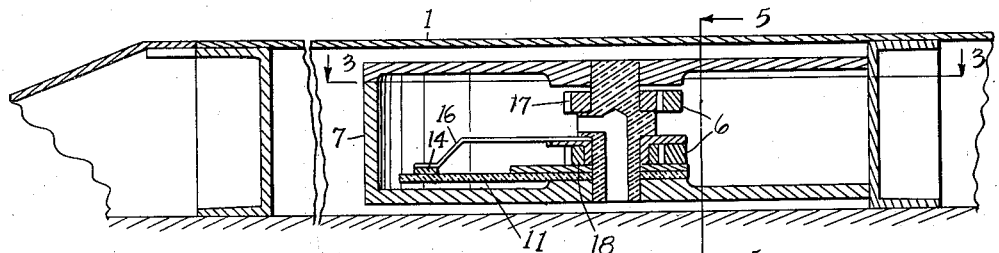
Fig. 4 is a fragmentary view sectioned on line 4—4 of Figs. 1, 3 and 5.
Figure 6:
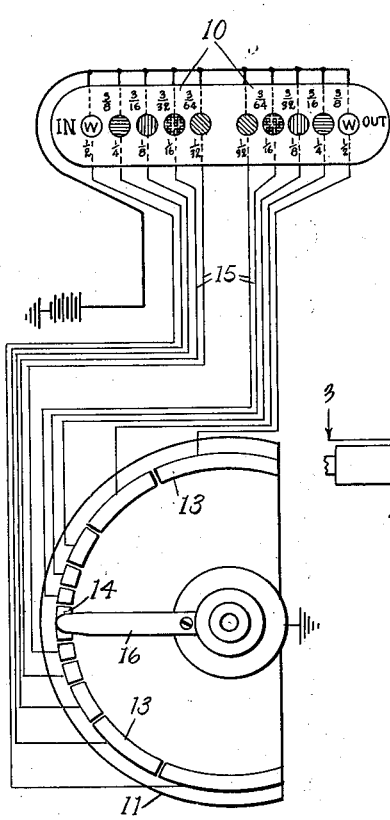
Fig. 6 is a diagrammatic view showing the relation of the control switch with the signal or indicator apparatus.
Figure 5:
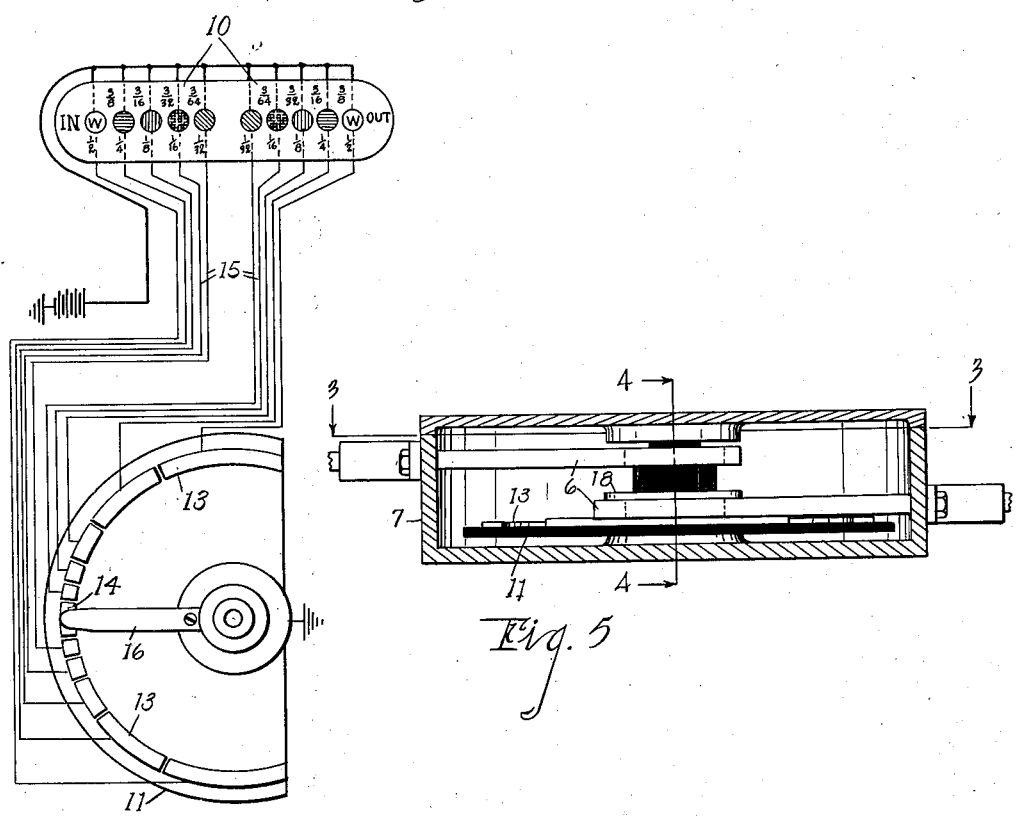
Fig. 5 is a fragmentary view partially in section on line 5—5 of Fig. 4.

In the embodiment of my invention illustrated, I provide a platform 1 upon which at least the front wheels of a motor vehicle may be driven. This platform has spaced openings 2 therein in which the wheel supporting or tread plates 3 are mounted for lateral floating movement, these plates being supported by the rollers 4 and held yieldingly in a central position by means of coiled springs 5. These parts are substantially the same as in my copending application for Letters Patent, Serial #519,302, filed Mar. 2, 1931, for Wheel alignment testing devices.

With the parts thus arranged the plates are yieldingly held in a central neutral position but are free to float laterally in either direction under the action of vehicle wheels driven thereon which may be out of alignment, the wheels out of alignment tending to cause friction between the wheels driven over the plate and the plate thereby moving or shifting the plate laterally, the plate being preferably roughened as indicated to increase this friction.

Each plate has a rack bar 6 connected thereto, the rack bars projecting into a housing 7 mounted between the tread plates.

In the embodiment illustrated, I provide a pedestal 8 at one side of the platform having a housing 9 at its upper end for an indicator means which, in the embodiment illustrated, comprises two duplicate sets of lamps designated generally by the numeral 10 and arranged in opposed relation.

These lamps preferably have gauging indicia associated therewith, this being in the fractions of the inch, the first lamp of each set having indicia, $\frac{3}{32}$ of an inch, the second, $\frac{1}{16}$, the third $\frac{1}{8}$, and so on, the indicia 3/64, $\frac{3}{32}$ and so on being positioned intermediate the lamps.

The lamps are preferably colored as indicated, the outer lamps being indicated by the letter "W" which indicates uncolored or white.

Other forms of electrically actuated signals might be employed—for instance, an annunciator or indicator.

In this embodiment illustrated, the signal or indicator apparatus has the word "in" at one end thereof and the word "out" at the other which indicates whether the out of alignment of the wheels tested is in an inward or outward direction.

The indicator or signal apparatus is controlled through a switch means comprising a contact member 11 which has two sets of contacts designated generally by the numeral 13 mounted thereon in segmental opposed relation relative to a central or neutral point 14. These contacts are of graduated lengths, the length increasing from the neutral point outward. The sets of contacts are connected to the sets of signals by the sets of wires indicated at 15.

The switch member 16 is also pivotally mounted on an axis coinciding with the axis of the contact member 11, the contact member having a pinion 17 secured to its hub while the switch member 16 has a pinion 18 secured to its hub, one of the racks 6 coacting with one of the pinions and the other with the other pinion, so that both the contact member and the switch are free to swing in either direction from the neutral point under the action of the tread plates, both members being free to swing in the same direction when the tread plates are actuated in the same direction as might occur if a motor vehicle were driven onto the tread plates at an angle, thereby compensating for such angle, but in the event the wheels are out of alignment this is indicated by what might be designated as differential in the movement.

By providing independently movable plates one connected to the switch member which is movable independently of the contact member and the other to the contact member which is movable independently of the switch member, it is possible by determining differential movement of the plates through determining differential movement between the switch member and the contact member to determine the angle between the wheels that roll over the plate. The tread plates are mounted for movement to or away from one another only and as a car passes over these plates moving substantially normal to the direction in which the plates can be moved, the apparatus records the angle between the wheels. As each front wheel of the car rolls over its respective plate, it imparts a force to that plate causing the plate to move outwardly if the wheels toe in or inwardly if they toe out.

With this arrangement of parts, it may be quickly determined whether or not wheels are out of alignment and if so, the degree.

I have illustrated and described my improvements in an embodiment which I have found very practical. I have not attempted to illustrate certain other embodiments or adaptations particularly in the matter of the indicator or annunciator and the control unit therefor as it is believed that this disclosure will enable those skilled in the art to embody or adapt my improvements as may be desired.

Having thus described my invention, what I claim as new and desire to secure by Letters Patent, is:

1. In an apparatus of the class described, the combination of tread plates, means supporting said plates for independent movement in a straight line to and from each other in the same plane, means acting to yieldingly hold said tread plates in a neutral position, sets of signal elements, a switch contact member and a switch associated therewith mounted for movement independently of each other, said switch contact member having sets of contacts mounted thereon, corresponding contacts of the sets being electrically connected to corresponding signal elements, said switch being operatively associated with said contacts, an operating connection for said switch member to one of said tread plates, and an operating connection for said switch to the other tread plate.

2. In an apparatus of the class described, the combination of tread plates, means supporting said tread plates for independent movement in a straight line to and from each other in the same plane, means acting to yieldingly support said tread plates in initial position, an indicator means, a plurality of contacts mounted for simultaneous movement in either direction from a neutral point and operatively associated with said indicator means, and a coacting switch member movable in either direction from a neutral position, and connecting means connecting said contacts to one tread plate for movement therewith and said switch member to the other tread plate for movement therewith, said connecting means being such that the contacts and switch member are both in neutral position when the tread plates are in their initial position.

3. In an apparatus of the class described, the combination of tread plates, means supporting said tread plates for independent movement in a straight line to and from each other in the same plane, an indicator means, a control means therefor comprising a movably mounted switch element provided with a plurality of contacts operatively associated with said indicator means, and a coacting movable switch member, connecting means from said contact member to one of said tread plates and connecting means from said switch member to the other of said tread plates, said connecting means being such that the switch and contact members are both in neutral position when the tread plates are in their neutral position.

4. In an apparatus of the class described, the combination of tread plates, means supporting said plates for independent movement in a straight line to and from each other in the same plane, means acting to yieldingly hold said tread plates in a neutral position, operatively associated cooperating indicator elements mounted for movement independently of each other, an operating connection for one indicator element to one of said tread plates, and an operating connection for another of said indicator elements to the other tread plate whereby said indicator elements are moved relatively to each other proportionately to the relative movement of said plates to and away from each other.

5. In an apparatus of the class described, the combination of tread plates, means supporting said plates for independent movement in a straight line to and from each other in the same plane, operatively associated cooperating indicator elements mounted for movement independently of each other, an operating connection for one indicator element to one of said tread plates, and an operating connection for another of said indicator elements to the other tread plate whereby said indicator elements are moved relatively to each other proportionately to the relative movement of said plates to and away from each other.

HENRY E. MUSSELMAN.